Patented Jan. 12, 1943

2,307,741

UNITED STATES PATENT OFFICE 2,307,741

WATER RATIO REDUCING AND WORKABILITY INCREASING COMPOSITIONS FOR CONCRETE AND OTHER HYDRAULIC MIXES

Herbert Goldstein, Elizabeth, N. J., and Leo Liberthson, New York, N. Y., assignors to L. Sonneborn Sons, Inc., a corporation of Delaware No Drawing. Application September 12, 1941, Serial No. 410,578

4 Claims. (Cl. 106—90)

This invention relates to new and useful improvements in water ratio reducing and workability increasing compositions for concrete and other hydraulic mixes.

Surface tension depressing agents have been known in the past as additions to concrete and other hydraulic mixes for the purpose of increasing workability, decreasing water ratio, and improving dispersibility of components of the mix. These practices, however, have not been satisfactory, primarily because the comparatively small amount of depressant in relation to the relatively large amounts and bulkiness of other materials of these mixes make it difficult to procure an effective uniform distribution throughout the mix, thus giving rise to local over-concentrations in some areas of the mix with resultant impairment of compressive strength in the concrete or other hydraulic mix or to local under-concentrations in other areas, resulting in insufficient hydration and lack of homogeneity of structure.

We have discovered a composition for admixture with concrete and other hydraulic mixes which will substantially avoid the foregoing disadvantages and drawbacks of the hitherto used agents and practices. The composition in accordance with our invention comprises an activated bauxite having yieldably absorbed, i. e., in excess of non-extractable amounts, a polyethylene glycol, polyethylene glycol ester or polyethylene glycol ether.

The bauxite that may be used in accordance with the invention is preferably an activated bauxite dust, i. e., a bauxite of a particle size substantially not larger than 200 mesh, the bauxite activation being obtained in accordance with conventional practices.

The polyethylene glycols that may be useful in accordance with our invention are, for instance, represented by the following generic formula—

in which $x$ is at least two in number. Preferred representatives of polyethylene glycols in accordance with the invention are, for instance, the products obtained by a condensation reaction between a polyethylene glycol and ethylene oxide. We prefer to use diethylene glycol for use in this reaction. The following example given by way of illustration and not of limitation describes one method of obtaining a suitable polyethylene glycol.

*Example I.*—1.06 parts by weight of diethylene glycol are heated to approximately 150° C. and then gradually admixed in an autoclave under a pressure of about ten atmospheres with .8 part by weight of ethylene oxide. The heating is continued until the reaction is substantially completed, which is indicated by the pressure reduction in the reaction vessel to practically normal. The condensation product is substantially colorless and water soluble.

The number of ethanoxy groups in the polyethylene glycol may be substantially controlled in most cases by the molecular proportions of reactants used. Instead of the diethylene glycol recited in the foregoing example by way of preparing the preferred product useful in accordance with the invention, other polyethylene glycols may be substituted. Various methods of producing polyethylene glycols or their derivatives are known to the art and may be used in the production of these products for application in accordance with our invention. The polyethylene glycols or their derivatives useful in the application of our invention should be substantially water soluble and should be substantially stable against strong electrolytes, i. e., aqueous solutions of inorganic salts. The latter characteristic is particularly important for a concrete additive of this type. Although we prefer to use the free polyethylene glycols, their derivatives, such as esters and ethers, being substantially water soluble and stable against strong electrolytes, may be used and special circumstances or considerations may sometimes make such practice desirable.

In the practical application of our invention the activated bauxite is preferably intimately contacted with the polyethylene glycol. If the latter, within the preferred selection of these substances, is liquid, the same may be mixed with the bauxite as such or sprayed upon an actively agitated bauxite mass. Alternatively, it is possible to use a suitable solution of these agents for the bauxite impregnation and if desired or necessary remove the solvent by drying or otherwise. Within the preferred embodiment of the invention, using normally liquid polyethylene glycols, such as tetraethylene glycol, it is of advantage to first intimately contact the same with a relatively small amount of activated bauxite so as to obtain a more or less saturated absorption and thereafter actively agitate the thusly impregnated bauxite with untreated bauxite, whereby the impregnated bauxite will yield polyethylene glycol to the untreated bauxite, thereby giving a uniformly impregnated product. Of the amount absorbed by activated bauxite, a certain percentage, which is substantially constant for a given bauxite, and usually in the neighborhood between 1 and 2% and varying, inter alia, with conditions of activation, is not yieldably absorbed, i. e., the same is not capable of being extracted from the bauxite. Amounts in excess of the non-yieldably absorbed impregnant are yieldably contained in the bauxite and are extractable or will be yielded by the bauxite to, for instance, aqueous media. Care, therefore, must be taken that the amount of polyethylene glycol absorbed or brought to absorption by the bauxite is in excess of the non-yieldable percentage amounts for that bauxite. Within the preferred practice of my invention good results are obtained with a bauxite absorbed content of polyethylene glycol of approximately 2%. We have found that an average conventionally activated bauxite will retain approximately 60% of the total amount of impregnant present, thus containing yieldably absorbed impregnant, i. e., extractable impregnant of .8% as compared with the total absorbed 2%.

Within the preferred procedure of our invention involving the first or preliminary preparation of a bauxite containing the polyethylene glycol impregnant absorbed in approximate saturation, the bauxite product will contain approximately 20% of the impregnant. When we refer to saturation or approximate saturation with respect to the absorption capacity of a bauxite in relation to the absorbent in accordance with our invention, we mean thereby the amount capable of absorption by the bauxite without losing its ability to flow freely as a dust, i. e., substantially maintaining the discreteness of its individual particles. The thusly prepared absorption concentrate may then be actively agitated with untreated bauxite dust, being added to the latter in a proportion to yield substantially 2% content of total bauxite absorbed impregnant.

In the use of the composition in accordance with the invention as admixture to concrete or hydraulic mixes, the same is preferably added to any one or preferably mixture of the solid components of the concrete or hydraulic mix. It may be in some cases desirable but usually is discretionary with the operator to compensate for the siliceous matter added in the bauxite by using less aggregate, i. e., sand or stones.

The following examples demonstrate practical results obtained by incorporating the aforedescribed admixture in a typical Portland cement concrete:

*Example II.*—A mixture of 23 lbs. of Portland cement and 69 lbs. of sand were gauged with 5200 cc. of water, giving a mix having an A. S. T. M. slump of 6." Cylinders cast from this mix gave a 28-day compressive strength of 4400 to 4600 lbs. per square inch.

*Example III.*—To a mix of 23 lbs. of cement and 69 lbs. of sand ½ lb. of an admixture composed of 98% of activated bauxite and 2% of polyethylene glycol, such as tetraethylene glycol, were gauged with 4200 cc. of water or approximately 20% less water than used in Example II. The A. S. T. M. slump on the mix containing the bauxite polyethylene glycol admixture was 6¾". Cylinders cast from this mix gave a 28-day compressive strength of 4800 lbs. per square inch.

It will be seen from the foregoing examples that the presence of the polyethylene glycol composition not only permitted a 20% reduction in water ratio, but increased the workability of the mix as measured by the approximately 12% increase in A. S. T. M. slump. At the same time the compressive strength of the resulting concrete was somewhat increased.

The foregoing specific description is for purposes of illustration and not of limitation and it is therefore our intention that the invention be limited only by the appended claims or their equivalents wherein we have endeavored to claim broadly all inherent novelty.

We claim:

1. Water ratio reducing and workability increasing compositions for concrete and other hydraulic mixes comprising activated bauxite carrying absorbed in excess of non-extractable amounts at least one member of the group consisting of substantially water soluble and strong electrolyte stable polyethylene glycols, polyethylene glycol esters and polyethylene glycol ethers with at least four ethenoxy groups.

2. Water ratio reducing and workability increasing compositions for concrete and other hydraulic mixes comprising activated bauxite carrying absorbed in excess of non-extractable amounts, at least one polyethylene glycol of the general formula $$OH-C_2H_4-(-O-C_2H_4-)_x-O-C_2H_4-OH$$

in which $x$ is at least two in number.

3. Water ratio reducing and workability increasing compositions for concrete and other hydraulic mixes in accordance with claim 2 in which said bauxite is a bauxite dust having a particle size not larger than substantially 200 mesh.

4. Method of reducing water ratio and improving workability in a concrete and the like hydraulic mix which comprises contacting an activated bauxite dust of a particle size not greater than substantially 200 mesh in excess of non-extractable amounts with at least one polyethylene glycol of the general formula $$OH-C_2H_4-(-O-C_2H_4-)_x-O-C_2H_4-OH$$

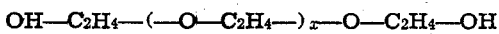

in which $x$ is at least two in number and incorporating the resulting bauxite containing absorbed impregnant into a concrete mix in amount sufficient to reduce water ratio at least 20%.

HERBERT GOLDSTEIN.
LEO LIBERTHSON.